Patented Sept. 21, 1937

2,093,461

UNITED STATES PATENT OFFICE 2,093,461

MAKING MANGANESE PHOSPHATE

Walter H. MacIntire, Knoxville, Tenn., assignor to Tennessee Valley Authority, Wilson Dam, Ala., a corporation of the United States No Drawing. Application June 22, 1935, Serial No. 28,025

2 Claims. (Cl. 23—105)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the production of manganese phosphate and more particularly to the production of manganese phosphate from the mineral rhodochrosite and concentrated phosphoric acid.

One of the objects of this invention is to produce a soluble manganese salt directly from a mineral resource in an economical manner. Another object of this invention is to produce a manganese salt which contains more than one essential element of plant food. Still another object of this invention is to produce a salt containing manganese as an essential element of plant food and not combined with other elements, such as chlorine or sulfur, which may be undesirable for the fertilization of certain crops, especially tobacco. Other objects of this invention include the production of a salt containing manganese as an essential element of plant food which may be used directly or incorporated in proper fertilizer mixtures.

Carbonates in general are usually considered to be soluble in mineral acids. Precipitated manganese carbonate has been dissolved in dilute phosphoric acid, while the natural manganese carbonate, rhodochrosite, is not dissolved by dilute phosphoric acid in the cold and only with prolonged heating at elevated temperatures. In any event, the undesirable excess of water from the dilute acid requires evaporation to produce a dry crystalline product.

I have found that rhodochrosite in a sufficiently fine state of division may be made to react with concentrated phosphoric acid under definite conditions to form mono-manganese phosphate, $MnH_4(PO_4)_2 \cdot 2H_2O$, a water soluble salt which is particularly adapted for use in supplying the element manganese to concentrated phosphatic fertilizers.

One example is given to show the operation of my invention. 672.4 parts by weight of 87.5% phosphoric acid are added to 338.5 parts by weight of rhodochrosite of less than 300 mesh, containing 84.3% $MnCO_3$, 8.91% $MgCO_3$, 3.57% $CaCO_3$, 2.06% $Fe_2O_3$ and $Al_2O_3$ and 0.65% $SiO_2$, are added and the mixture vigorously agitated until a creamy suspension is formed. The mixing proceeds for ten to fifteen minutes before any marked change in appearance of the mixture is evident. The creamy suspension contains some partially reacted material mixed with the unreacted rhodochrosite and concentrated phosphoric acid impregnated with carbon dioxide. This gas-distended body collapses in sixteen hours or less into a mass containing crystals of mono-manganese phosphate and some undecomposed rhodochrosite and some free phosphoric acid. Upon further standing the mixture gradually becomes a mass of damp crystals resembling a corresponding bulk of magnesium chloride. At the end of a curing period of three weeks there is obtained 900 parts by weight of a slightly hygroscopic mixture consisting substantially of crystalline mono-manganese phosphate. This product is in a condition suitable for admixture with other and proper fertilizer materials.

It is evident that there are numerous factors which will influence conditions for the most satisfactory operation of my process, the actual limits of which cannot be established except by detailed study of each set of raw materials and finished products involved. The natural manganese carbonate, rhodochrosite, must be finely pulverized and should have a fineness of at least 300 mesh. The amount of phosphoric acid required is substantially the theoretical amount required to react with the bases present in the rhodochrosite to convert them into mono-phosphates. The water required for the hydration of the mono-manganese phosphate is supplied by the water produced in the reaction and the water contained in the concentrated phosphoric acid. However, a slightly less concentrated acid may be used to supply the water which is unavoidably lost by evaporation during the curing. The concentrated phosphoric acid which has so far been found preferable contains 80 to 90% $H_3PO_4$. It is necessary that the very fine rhodochrosite and the concentrated phosphoric acid be intimately mixed for a relatively short period of time until a creamy suspension is formed and then this suspension may be cured to form resulting product at atmospheric temperature. This period of curing may be shortened by an elevation of the temperature of the creamy suspension up to 100° C. for a short period of time if it is imperative to reduce the time of manufacture. The product is a fine, crystalline material, consisting principally of mono-manganese phosphate, slightly hygroscopic. It may be incorporated along with other essential plant food elements in the desired proportion or may be further processed prior to such incorporation if it is necessary to have a non-hygroscopic and free-flowing constituent for such mixtures prior to admixture. A somewhat more concentrated material containing manganese in a form in which it is available for plant food may be obtained by heating the manganese phosphate to a superatmospheric temperature, such as 50 to 100° C., for the removal of water from the hydrate.

It will be seen, therefore, that this invention actually may be carried out by the modification of certain details without departing from its spirit or scope.

I claim:

1. Process of making mono-manganese phosphate from rhodochrosite and phosphoric acid comprising mixing intimately the fine rhodochrosite of 300 mesh with the concentrated phosphoric acid containing 80 to 90% $H_3PO_4$ until the mixture forms a creamy suspension, and curing the mixture at atmospheric temperature until the product is substantially the fine crystalline manganese phosphate, $MnH_4(PO_4)_2 \cdot 2H_2O$.

2. Process of making mono-manganese phosphate from rhodochrosite and phosphoric acid comprising mixing intimately the fine rhodochrosite, of at least 300 mesh, with the concentrated phosphoric acid containing 80 to 90% $H_3PO_4$ until the mixture forms a creamy suspension, and curing the mixture at a superatmospheric temperature, not to exceed 100° C., until the product is the fine, granular mono-manganese phosphate.

WALTER H. MacINTIRE.